(12) United States Patent
Roberts (10) Patent No.: US 8,895,139 B2
(45) Date of Patent: Nov. 25, 2014

(54) ISOTROPIC NANO CRYSTALLITES OF POLYTETRAFLUOROETHYLENE (PTFE) RESIN AND PRODUCTS THEREOF THAT ARE BIAXIALLY PLANAR ORIENTED AND FORM STABLE

(76) Inventor: Robert Roberts, Ocala, FL (US)

( * ) Notice: Subject to any disclaimer, the term of this patent is extended or adjusted under 35 U.S.C. 154(b) by 177 days.

(21) Appl. No.: 12/826,360

(22) Filed: Jun. 29, 2010

(65) Prior Publication Data

US 2010/0323277 A1 Dec. 23, 2010

Related U.S. Application Data

(63) Continuation-in-part of application No. 11/701,901, filed on Jan. 31, 2007, now Pat. No. 7,744,792, which is a continuation-in-part of application No. 10/401,995, filed on Mar. 27, 2003, now abandoned.

(51) Int. Cl.
*D04H 1/00* (2006.01)
*B32B 5/16* (2006.01)
*B29C 70/04* (2006.01)
*B29C 45/00* (2006.01)
*B29K 27/18* (2006.01)

(52) U.S. Cl.
CPC .............. *B29C 70/04* (2013.01); *B29C 45/0005* (2013.01); *B29K 2027/18* (2013.01)
USPC .......................... 428/292.1; 428/323; 428/331

(58) Field of Classification Search
None
See application file for complete search history.

(56) References Cited

U.S. PATENT DOCUMENTS

| | | |
|---|---|---|
| 2,230,654 A | 2/1941 | Plunkett et al. |
| 2,440,190 A | 4/1948 | Alfthan |
| 2,752,637 A | 7/1956 | Walker et al. |
| 2,936,301 A | 5/1960 | Thomas |
| 3,003,912 A | 10/1961 | Harford |
| 3,010,950 A | 11/1961 | Thomas |
| 3,277,419 A | 10/1966 | Butz |
| 3,520,416 A | 7/1970 | Keedwell |
| 3,556,161 A | 1/1971 | Roberts |
| 3,766,133 A | 10/1973 | Roberts et al. |
| 4,096,227 A * | 6/1978 | Gore .............................. 264/110 |
| 4,110,392 A | 8/1978 | Yamazaki |

(Continued)

FOREIGN PATENT DOCUMENTS

| | | |
|---|---|---|
| JP | 6-17670 | 6/1994 |
| JP | 6-238684 | 8/1994 |

(Continued)

*Primary Examiner* — Jennifer Chriss
*Assistant Examiner* — Camie Thompson
(74) *Attorney, Agent, or Firm* — Saliwanchik, Lloyd & Eisenschenk (57) ABSTRACT

The subject invention concerns the use of staple length nano polytetrafluoroethylene (PTFE) crystallites obtained by liquid shearing PTFE dispersion particles that are wet by a liquid with a surface tension below 30 dynes/cm this liquid will spread on PTFE resin surfaces and has a contact angle of zero (0) degrees with a PTFE surface. Staple length PTFE resin micro-fibers will form rapidly under high liquid shearing force at 125° C. when diluted 1 part PTFE resin to 20 parts liquid. The subject invention also includes the application of products that are multi-directional planar oriented and isotropic as sheet, membranes and structures useful for high performance filtering, fuel and solar cells and related energy applications. It also concerns products made from formulations as coatings and product for forming, shaping and molding sheet and structures of the subject invention and methods of adhering, bond and laminating components of these structures without adhesives.

12 Claims, 2 Drawing Sheets

(56) References Cited

U.S. PATENT DOCUMENTS

| | | | |
|---|---|---|---|
| 4,153,661 A * | 5/1979 | Ree et al. | 264/120 |
| 4,339,325 A | 7/1982 | Solomon et al. | |
| 4,421,834 A | 12/1983 | Zupancic | |
| 4,576,608 A | 3/1986 | Homsy | |
| 4,863,604 A | 9/1989 | Lo et al. | |
| 4,877,661 A * | 10/1989 | House et al. | 428/34.9 |
| 4,950,538 A | 8/1990 | Honda et al. | |
| 4,985,296 A | 1/1991 | Mortimer, Jr. | |
| 5,154,827 A | 10/1992 | Ashelin et al. | |
| 5,217,666 A | 6/1993 | Tamaru et al. | |
| 5,300,366 A | 4/1994 | Nakamaru et al. | |
| 5,324,785 A | 6/1994 | Noda et al. | |
| 5,470,409 A | 11/1995 | Deakyne et al. | |
| 5,744,241 A | 4/1998 | Hobson et al. | |
| 5,910,378 A | 6/1999 | Debe et al. | |
| 5,922,453 A | 7/1999 | Horn et al. | |
| 5,935,667 A | 8/1999 | Calcote et al. | |
| 5,972,494 A | 10/1999 | Janssens | |
| 6,099,791 A | 8/2000 | Shannon et al. | |
| 6,110,333 A * | 8/2000 | Spethmann et al. | 204/252 |
| 6,352,660 B1 | 3/2002 | Friedrich et al. | |
| 2002/0045041 A1 | 4/2002 | Dillon et al. | |
| 2002/0082320 A1 | 6/2002 | Sarkis et al. | |
| 2004/0191525 A1 | 9/2004 | Roberts | |
| 2005/0212160 A1 | 9/2005 | Roberts | |
| 2006/0292324 A1 | 12/2006 | Roberts | |

FOREIGN PATENT DOCUMENTS

| | | |
|---|---|---|
| JP | 10-195793 | 7/1998 |
| JP | 2003-49387 | 2/2003 |
| JP | 2004-091948 | 3/2004 |

* cited by examiner

ISOTROPIC NANO CRYSTALLITES OF POLYTETRAFLUOROETHYLENE (PTFE) RESIN AND PRODUCTS THEREOF THAT ARE BIAXIALLY PLANAR ORIENTED AND FORM STABLE

CROSS-REFERENCE TO RELATED APPLICATIONS

The present application is a continuation-in-part of application U.S. Ser. No. 11/701,901, filed Jan. 31, 2007, now U.S. Pat. No. 7,744,792, which is a continuation-in-part of application U.S. Ser. No. 10/401,995, filed Mar. 27, 2003, each of which is hereby incorporated by reference in its entirety including any tables, figures, or drawings.

BACKGROUND OF THE INVENTION

Ever since the discovery of polytetrafluoroethylene (PTFE) polymer researchers have been looking for ways to reduce the particle size of as polymerized PTFE resin, comminuting produced anisotropic particles which required equipment pressures above 2,000 psi that have severely limited the resins capability. Products produced contained pores and exhibited poor properties that severely restrict PTFE resin utility. By the time the cause for these limitations was fully recognized the Plunkett patent (U.S. Pat. No. 2,230,654) had expired (1958). No further research dollars were spent on "TEFLON" PTFE resin, interest shifted to melt processable "TEFLON": tetrafluoroethylenehexafluoropropylene (FEP), perfluoroalkoxy tetrafluoroethylene (PFA), and ethylenetrifluoroethylene (ETFE), etc. to solve PTFE's problems.

Advanced technology practiced in this invention looks at methods beyond early polymer chemistry to solve PTFE resin fabrication problems. The simple steps of attrition, temperature and pressure used in the art for low molecular weight polymers like polyethylene and nylon do not apply to PTFE resin's problems.

Early recognition of PTFE polymer's high molecular weight and high crystalline content, near 100 percent, set the stage for research. Serious research didn't begin until the early 1950's, twelve years after the PTFE patent (U.S. Pat. No. 2,230,654) was filed, interrupted by World War II. Because the problem seemed too complex for a quick solution, the industry dealt with the problem by developing lower molecular weight melt processable resins FEP, PFA, ETFE, and others in hope of solving PTFE's problems. FEP was introduced coincident with the decision to stop PTFE research.

It became evident early that the large polymerized PTFE resin aggregates would require attrition later found to be the root cause for poor moldability and also that water cut coagulated dispersion polymer by Thomas (U.S. Pat. No. 2,936,301) had the same strain instability characteristics; both particle forms were anisotropic with built in memory and a desire to relieve strain when compressed or sintered.

Unlike natural fibers and synthetic fibers of commerce, the fibers of this invention are isotropic and remain form stable with changes in temperature including the drying and final sintered steps. All synthetic melt processable fibers are melt-extruded and become anisotropic; consequently they shrink when exposed to high levels of heat because longitudinal orientation has been introduced by melt extrusion plus intentional fiber draw down introduced during cooling All granular PTFE resins of commerce are anisotropic (Encyclopedia of Polymer Science and Technology (1970)). Granular PTFE resin is polymerized into large particles that must be reduced in size by attrition to be of any use. Attrition introduces molecular strain and anisotropy. Granular PTFE resin is used today predominantly in automatic compression molding where high preform pressures of the order of 5,000 to 10,000 psi are needed. Such pressure is far too high to be economical or practical if used for molding large parts. Small parts are used for mechanical friction and wear applications where part porosity is not important, like small diameter washers, rings, and sleeves.

The anisotropic fibers of Harford (U.S. Pat. No. 3,003,912) and Thomas (U.S. Pat. No. 2,936,301) and the isotropic product of this invention are possibly the only stand alone PTFE fibers available. The fibrils produced by W.L. Gore Company (Newark, Del.), Donaldson Company (Minneapolis, Minn.), and BHA Group (Atlanta, Ga.) are anisotropic and are an integral part of their product and an irreversible part of the finished sintered product, and all have limited utility in filtering and textiles products.

Anisotropic fibrils are prepared by Friedrich (U.S. Pat. No. 6,352,660), Debe (U.S. Pat. No. 5,910,378), Solomon (U.S. Pat. No. 4,339,325), and Ree (U.S. Pat. No. 4,153,661) but all are highly contaminated with foreign substances mixed or embedded in the product added to induce fibrillation or fiber-like structures that form during long batch processing working the ingredients abrasively in a viscous concentrated mix of hot molten polymer to become embedded into these particulates to contaminate and making it too difficult and costly to extract. All products produced using the methods of the Friedrich, Debe, Solomon, and Ree patents are anisotropic and are used unsintered to instill product porosity where contamination is not critical and where fusion temperature will not be encountered. The products have little strength.

The use of a contaminated fluoropolymer in products and/or processes is rare and practically unheard of. However, the use of contaminated fluoropolymer in chlor-alkali cells is a rare exception as these products have very limited use outside this industry.

BRIEF SUMMARY OF THE INVENTION

The subject invention concerns staple length isotropic PTFE micro-fibers and methods for their preparation. In one embodiment, about one (1) part of PTFE coagulated dispersion particles are contacted with about 20 parts of a wetting liquid having a contact angle of zero (0) degrees on a PTFE surface or a surface tension of less than about 30 dynes/cm to form a liquid slurry at about 125° C. and then mixing the composition at about 2,000 feet per minute rotor blade tip speed. Continuous length isotropic PTFE fibers can be prepared using the above method at a temperature of about 200° C. rather than 125° C.

The subject invention also concerns multi-directional planar oriented isotropic polytetrafluoroethyene (PTFE) resin sheets and membrane structures and methods for preparing the same. The subject invention also concerns products coated with the multi-directional planar oriented isotropic PTFE compositions of the invention. The subject application also concerns a laminated multi-directional planar oriented isotropic PTFE form stable matrix. The subject invention also concerns nano crystallites produced by the subject methods.

The subject invention provides a novel method of releasing nano PTFE crystallites from as polymerized dispersion particles by liquid shear at 125° C. in a liquid that truly wets and penetrates PTFE resin dispersion particles, wherein the crystallites are realigned in the liquid shear stream to form discrete staple length isotropic micro-fibers. The highly diluted, randomly mixed, staple length micro-fibers can be deposited on a porous surface to form an interlocking fiber-mat which is isotropic and provides the source for fabricating structures for products previously thought impossible and now easily fabricated under conditions far less demanding and less stringent than necessitated by the use of anisotropic particles. Continuous lengths of isotropic multi-directional planar oriented sheet which can be unfilled, filled, reinforced, alloyed, or in combinations thereof are provided. The fiber-mat or the mix before being deposited can be used as a coating that will not have a "critical cracking thickness", and is capable of thicknesses of 5 mils or more depending on the substrate to be coated. Sections of fiber mat sheet and compounded compositions containing 16 to 20 percent lubricant, before being dried and sintered can be removed and easily shaped, formed and embossed by compression molding methods. Fiber mat compositions containing approximately 18% wetting liquid can be laminated at low pressure, dried, and sintered without the need for adhesives.

The isotropic micro-fibers of this invention are most desirable because they enable polytetrafluoroethylene resin to be continuously processed directly into sheet and other products never before possible in the art, which has been a major barrier to competing with the much more expensive melt processable resins. Micro-fibers make PTFE resin processing simple and straight forward.

DETAILED DESCRIPTION OF THE INVENTION

Figure 1:
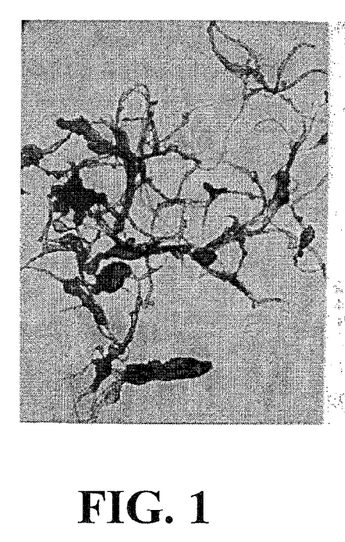
FIG. 1 shows a photomicrograph of TEFLON 6 fibers produced by the present invention in shear at a moderate temperature of 100 degrees Centigrade.
Figure 2:
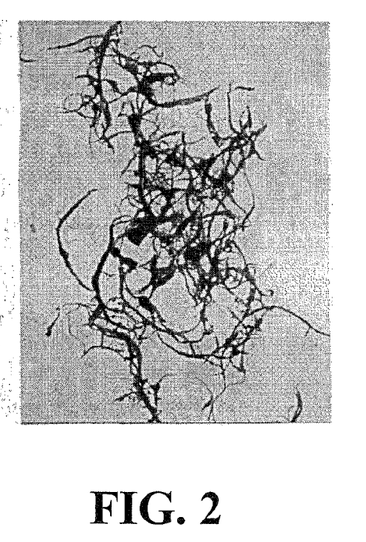
FIG. 2 shows a photomicrograph of TEFLON 6 fibers produced by the present invention at 150 degrees Centigrade.
Figure 3:
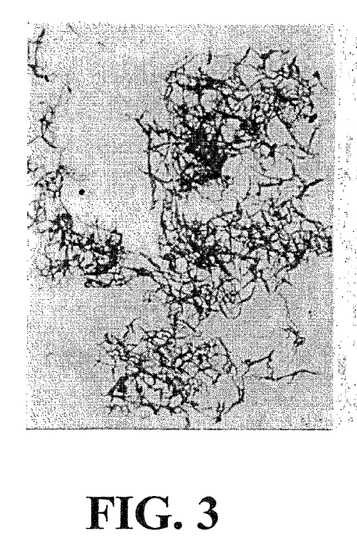
FIG. 3 shows a photomicrograph of TEFLON 6 coagulated dispersion resin fibers produced by the present invention at 125 degrees Centigrade.
Figure 4:
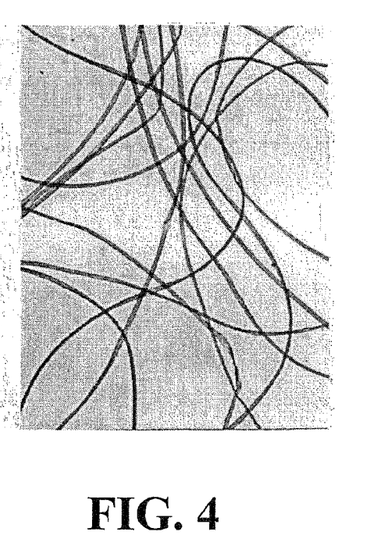
FIG. 4 shows a photomicrograph of TEFLON 6 fibers produced by the present invention at 200 degrees Centigrade.
Figure 5:
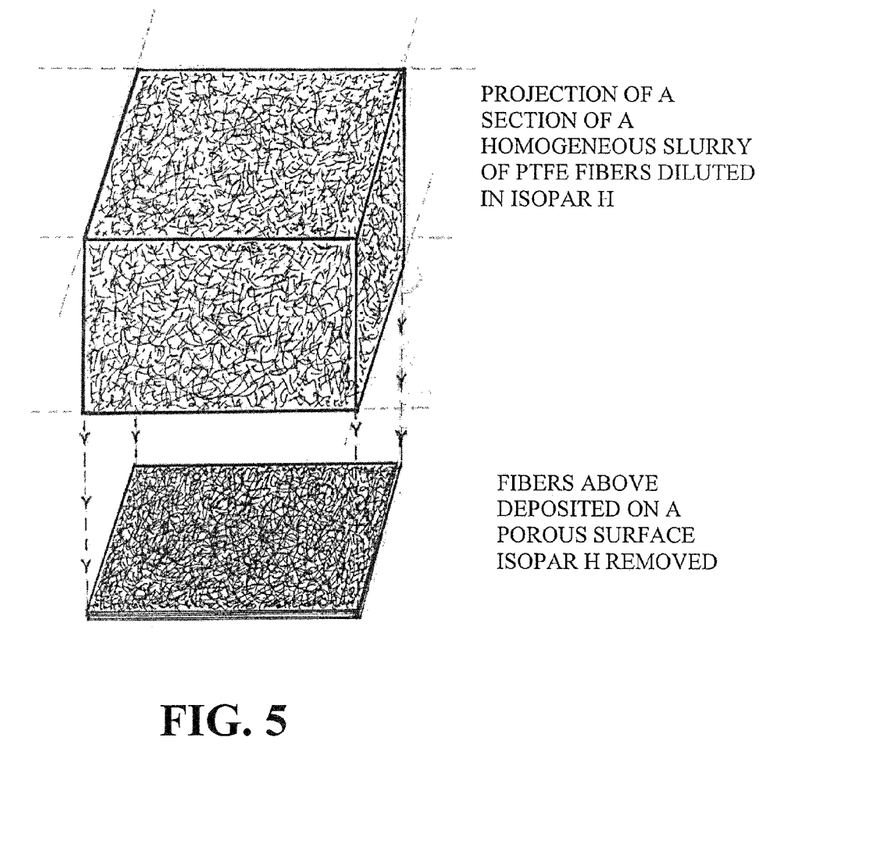
FIG. 5 shows a perspective view showing the formation of the "fiber mat" before heating to form the PTFE resin sheet.

The subject invention concerns staple length isotropic PTFE micro-fibers and methods for their preparation. In one embodiment, about one (1) part of PTFE coagulated dispersion particles are contacted with about 20 parts of a wetting liquid having a contact angle of zero (0) on a PTFE surface or a surface tension of less than about 30 dynes/cm to form a liquid slurry at about 125° C. and then mixing the composition at about 2,000 feet per minute rotor blade tip speed. Continuous length isotropic PTFE fibers can be prepared using the above method and a temperature of about 200° C. rather than 125° C. In a specific embodiment, the wetting liquid is ISOPAR H.

The subject invention also concerns multi-directional planar oriented isotropic polytetrafluoroethyene (PTFE) resin sheets and membrane structures and methods for preparing the same. The subject invention also concerns products coated with the multi-directional planar oriented isotropic PTFE compositions of the invention. The subject application also concerns a laminated multi-directional planar oriented isotropic PTFE form stable matrix.

The present invention provides a new method of processing polymers and particularly polytetrafluoroethylene (PTFE) polymer, wherein solids are processed in micron and submicron size in liquid that truly wet the polymer in solid form and acts as a carrier for the resin during processing and forming as opposed to the art of melting the solid polymer and depending on its melt flow properties to provide for handling and processability. The solid state slurry approach to fabrication practiced by this invention solves many of the resin compounding, handling and processing problems of current art melt processing technology originated and perpetuated by the invention of nylon and polyethylene almost 80 years ago.

Solid state slurry processing was developed specifically to re-energize polytetrafluoroethylene (PTFE) abandoned in the early 1960's because it would not melt and therefore was difficult to impossible to fabricate; abandoned with the hope that melt processable fluoropolymers would solve PTFE problems.

The present invention not only solves PTFE resin problems but demonstrates how solid state technology can mutually benefit both PTFE and melt process fluoropolymers as well as provide improved methods of compounding and fabricating any polymer that can withstand the processing temperatures of PTFE resin and teaches how to successfully compound others.

Each spheroidal dispersion particle of polytetrafluoroethylene (PTFE) polymer is very nearly 100% crystalline and comprises nano crystallites.

Isotropic staple length micro-fibers transported in a homogeneous wetting isoparafinic slurry provide an ideal opportunity to randomly deposit micro-fibers as a mat of interlocking fibers on a porous surface; if the porous surface moves the mat of fibers can be compressed between rolls, dried and sintered into a form stable isotropic biaxially planar oriented sheet.

Wetted sheet containing approximately 18% wetting liquid can be excised and reformed while wet into new shapes, embossed and laminated to revive the art of compression molding abandoned in the 1960's.

The subject invention provides for, but is not limited to:
1. Conversion of spherical isotropic PTFE dispersion particles into isotropic nano crystallites.
2. Nano crystallites restructured into staple length micro-fibers or continuous fiber lengths.
3. Products made of nano crystallite micro-fibers of the invention that are isotropic multi-directional planar oriented and form stable in the plane of the product surface, the x and y dimension, and wherein changes in volume due to temperature occur in thickness, the z dimension.
4. Product stability enables lamination to other form stable sheet product as well as to other form stable surfaces without distortion to aid bondability.
5. PTFE resin alloyed with polymers such as polyethcretherketone (PEEK) that adhere to thermally stable surfaces.
6. A simple continuous process for producing PTFE sheet products, unfilled, filled reinforced and/or alloyed.
7. A simple direct feed product for compression molding PTFE resin; forming, shaping, and embossing products that are unfilled, filled, reinforced and alloyed with melt process polymers.
8. A PTFE-coated product or alloyed coated product with no limit as to thickness and that can be applied to heat resistant surfaces without the use of a primer when one alloying polymer has adhering capability.

The present invention should be of special interest to those engaged in green technology particularly, in developing cost effective methods for preparing fuel and solar cells and related products such as porous electrodes needed to easily fabricate long lengths of layered flat membrane or sheet structures continuously with long life (greater than 20 years) and retained flexibility.

The present invention solves particle handling and fabrication problems of polytetrafluoroethylene (PTFE) resin.

Products of the wet processing technology of the invention can be processed continuously and are completely fabricated before they are fused; the products can be highly filled, reinforced and alloyed with other polymers.

The temperature of the wetting liquid utilized in methods of the present invention is a causative factor in fiber formation in this invention. Fiber formation begins almost immediately on introduction of coagulated dispersion resin to 125° C. wetting liquid shear. Fibering adequate to prepare staple length micro-fibers occurs immediately at a tip rotor speed of about 2000 feet per minute. The increase in mass on polytetrafluoroethylene PTFE fiber formation occurs so quickly that addition of cold wetting liquid is necessary to preserve the fluidity of the slurry. At higher temperatures, the fibering process is accelerated and shearing speed can be reduced significantly.

Conditions Relevant to the Present Invention Include

Melting Point Definition

The crystalline melting point of stand alone polytetrafluoroethylene dispersion resin as applied in this invention is 327° C., as determined by a polarizing light microscope fitted with crossed nicols. Prior to applying heat the particulate samples of polytetrafluoroethylene resin are birefringent. Once the birefringence disappears the resin particle is considered melted. According to the literature (Encyclopedia of Polymer Science and Technology (1970); Kirk-Othmer (1966)) PTFE resin has two (2) melting points, the first at 342° C. and the second irreversible at 327° C. It is very important in the case of PTFE molding resin to realize that the particulate commercial forms are all anisotropic (Encyclopedia of Polymer Science and Technology (1970)) strained during manufacture. Straining may also occur during sample preparation for testing. Neither of the above references provides this information. It is also important to know the rate of heating and a detailed description of how the sample was prepared.

Once the strain is removed from the anisotropic sample, the true isotropic melting point of 327° C. is obtained and is irreversible.

This invention deals with isotropic resin and products.
Isotropy and Anisotropy

"The properties of a crystal or material such as tensile strength, elasticity, heat conductance, electrical conductance, rate of transmission of light, and rate of solution may be different along different axes such as a crystal or material is said to be anisotropic." "An isotropic crystal or material is one which has the same properties in all directions" (Daniels (1948)).

Dispersion particles of the present invention are isotropic, as are products of the invention (both as sintered and unsintered products).
Isotropic Planar Stable Products In order to qualify as being dimensionally stable, products of the present invention can have tensile strength or x-ray diffraction determinations that indicate the products' properties are approximately equal in all planar directions and perform as a form stable product. Introducing orientation biaxially by the same method, or by two or more different methods, must meet the above conditions; stretching in two directions does not always meet these criteria as thought by many.
Homogeneous Mixing Homogeneous mixing makes complex compounding possible, wherein all particles involved are microscopic or submicroscopic in size, so that intimate contact and homogeneous mixing is possible. It is also important that mixing be carried out in a liquid that wets the components being mixed, i.e., has a contact angle with PTFE surfaces of about zero (0) degrees and a surface tension below 30 dynes/cm. Mixing dilution should preferably be about 20 parts wetting liquid to 1 part PTFE solids or adequate to prevent clumping and promote particle separation and homogeneous flow.
Application of Shear Shear in the present invention can be applied by liquid traveling at approximately 2,000 feet per minute induced by the speed of a rotor blade tip (comparable to a Waring Blender on high); actual particle impact by the rotor blade is highly improbable because of the size of microscopic and submicroscopic PTFE particles and their dilution (e.g., 20 parts wetting liquid to 1 part PTFE solids). Liquid shear is complimented by the penetrating qualities of the wetting liquid ("The surface tension of a liquid decreases as the temperature rises and molecular agitation increases. At the critical temperatures when the liquid becomes indistinguishable from a gas, the surface tension should become practically zero." Daniels (1948)). Liquid shear provides enough direct energy to free thousands of nano-size crystallites contained within each dispersion particle; the liquid shearing stream and molecular attractive forces provide a path to re-orient and align the crystallites, into staple length micro-fiber form at 125° C., whereas continuous length fibers form at 200° C. Surprisingly, this is done without introducing strain; thus, the fibers are isotropic. The fibers of the present invention are different than melt extruded fibers which are anisotropic due to the strain applied to nascent particles in intimate contact with each other in the melt when mixed and during melt extrusion.
Temperature Temperature is also important because if 327° C. is exceeded in the methods, then the PTFE resin particles immediately bond to one another and become anisotropic. Any movement above 327° C. when the particles are unprotected by a wetting liquid is critical to their future status as an isotropic product.
Contact Angle and Wettability Wettability is best defined by the ability of a liquid to wet a surface as measured by that liquid's contact angle with that surface. Water does not wet PTFE resin; it has a contact angle of 108° with PTFE surfaces, it forms beads of water on its surfaces. In contrast, certain isoparaffin fluids such as ISOPAR H (ExxonMobil Chemical Company, Houston, Tex.) spread on PTFE surfaces, therefore no angle may be measured. The contact angle of ISOPAR H is zero (0) (the surface tension of a liquid can be used to aid in selecting a suitable liquid; a surface tension of less than 30 dynes/cm is a candidate). It is also important to select a liquid that will have a boiling point within the expected processing range so that the liquid will remain in the liquid phase to wet. In the gaseous condition the principles of the invention are not workable; there is no liquid wetting. ISOPAR H boils at 176° C., whereas processing takes place at around 125° C.
Capillary Attraction Capillary attraction is also important in the present invention. When a capillary tube of PTFE of one-thirty second (1/32) inch diameter is placed in water (contact angle 108°) the water does not rise; it is repelled. If the same tube is placed in ISOPAR H (contact angle 0°) there is an immediate rise. If a series of progressively smaller PTFE capillary tubes are inserted into the ISOPAR H, the capillary rise will increase with the decrease in diameter of each tube. It can be shown mathematically that a significant increase in cohesive force will result as the tube diameters decrease. It can also be shown that in the case of water there is a corresponding force repelling water's entry.

A preform of packed particles forms a complex system of capillaries as in this invention. The pore structure of preforms is comprised of colloidal size particles ranging in diameter of about 0.05 to about 5.0 microns, with an average diameter of about 0.2 micron. Calculations indicate the force developed may be as great as or greater than about 1000 psi for particles of this average size.

The forces that are drawing particles together are substantial; therefore it should be apparent that the preforms will have excellent strength, integrity, and flexibility. Likewise there is reason to understand why preforms produced in the art have little strength since when wetting is attempted with water as particles are thrust apart by pressure and when dry the coalescing force of a wetting liquid has not been able to act; as a result, preforms are fragile.

The force of capillary attraction explains cracking in water dispersion coatings when thicknesses greater than 1 mil are attempted. It also explains why anisotropic granular compression molding powders are fragile. They are dimensionally unstable to begin with and do not have the coalescing assistance of a true wetting liquid during processing.

Hydrostatic Coalescible State

The basis for the hydrostatic coalescible state is capillarity. Capillarity provides the force to draw the particles of a consolidated packing of particles together to provide strength and prevent cracking when the wetting liquid is removed. These compacting forces plus Van der Waals forces aid particles in contact to coalescence on drying and aid fusion on sintering. A preform of ideally packed particles contains void spaces ranging between about 16 and 20 percent according to J. M. Dalla Valle (Dalla Valle et al. (1943)).

Isotropic Micro-fibers

The isotropic micro-fibers of the present invention are novel; they remain isotropic and form stable once formed by the process of this invention. PTFE resin prepared by the process of the present invention is isotropic. When sintered (fused), the x-y dimensions of a molded part comprising PTFE prepared by the present invention will remain virtually unchanged and form stable; the z dimension, thickness, will increase or decrease with volume change resulting from changes in temperature. All granular molding resins known in the art are anisotropic; consequently, major changes occur in the x-y dimensions of the molding while the z dimension thickness becomes thinner, when sintered (see Encyclopedia of Polymer Science and Technology, page 64 (1970)).

Isotropic particles and micro-fibers of the invention have physical properties and behavior that is equal in the plane of the sheet regardless of direction of measurement. These particles are neutral to external stimuli such as heat or pressure.

Anisotropic particles and fibers (fibrils) taught in the art have physical properties and behavior that varies according to the direction in which a stimulus is applied or measured, particularly as to force and temperature. When stimuli are applied, the particles respond and the dimensions of the part become unstable.

All patents, patent applications, provisional applications, and publications referred to or cited herein are incorporated by reference in their entirety, including all figures and tables, to the extent they are not inconsistent with the explicit teachings of this specification.

Following are examples that illustrate procedures for practicing the invention. These examples should not be construed as limiting. All percentages are by weight and all solvent mixture proportions are by volume unless otherwise noted.

Example 1

This example describes changing the structure of isotropic stand-alone colloidal dispersion particles of PTFE resin into isotropic staple length micro-fibers and continuous length fiber product by extracting and rearranging the nano size crystalline content within each dispersion particle; isotropic fiber structures are a new composition of matter for polytetrafluoroethylene (PTFE) resin. Twenty (20) parts of ISOPAR H hydrocarbon oil at 125 degrees centigrade is added to one (1) part of "TEFLON" 6 (DuPont) coagulated dispersion resin (having an average particle size of 500 microns, containing dispersion resin particles 0.05 to 5.0 microns size) said mixture is stirred at a tip rotor speed of 2000 feet/minute, within 3 to 5 minutes a thick slurry of isotropic micro-fibers form that are one quarter inch (¼) to three eights inch (⅜) long with an average diameter ranging from five (5) to thirty (30) microns long. The thick slurry is diluted further with thirty-five (35) part ambient temperature ISOPAR H and stirred further for an additional forty-five (45) seconds to produce a thinned slurry. The thinned slurry is poured into a twelve inch (12" by 12") paper mold (containing a Whatman No. 1 filter paper). A vacuum of approximately twenty-five inches (25) of mercury is applied to settle the micro-fibers and remove the liquid component and form a "fiber mat" of interlocking fibers. The "fiber mat" is removed from the paper mold and compressed at a pressure of approximately 200 psi to consolidate the "fiber mat" then dried further at around 125 degrees Centigrade in an oven to volatize all the remaining ISOPAR H; the thoroughly dried "fiber mat" is then free sintered for thirty (30) minutes in an oven at 380° C. to provide a sheet with smooth surfaces. The above multi-directional planar oriented isotropic sheet has an average tensile strength of 4,500 psi and an average elongation of 350% when measured in any planar direction of the sheet.

Example 2

This example employs PTFE dispersion particles from an aqueous dispersion rather than coagulated dispersion resin. Slurrying an aqueous dispersion with a water miscible liquid such as an alcohol and removing the water by filtration or by admixing a water-immiscible liquid with aqueous dispersion such as carbon tetrachloride which wets PTFE resin, adding an electrolyte such as hydrochloric acid and stirring until the PTFE resin is transferred into the non-aqueous liquid, decanting the aqueous phase; then filtering the solid PTFE from the carbon tetrachloride to leave PTFE resin.

Example 3

This example describes producing continuous lengths of micro-fiber interlocked sheet product following the method of Example 1 employing coagulated dispersion resin as the PTFE resin feed or alternatively the PTFE dispersion particle feed of Example 2. Once the isotropic micro-fibers are formed according to Example 1 only the slurry is deposited onto a continuous moving porous surface provided with a vacuum similar to those used in papermaking to remove ISOPAR H, then compressed between large diameter (12 to 24 inches in diameter) rolls at low pressure, to consolidate only and not increase "fiber mat" sheet lengths; the consolidated sheet is then dried by infrared heat not to exceed 300 degrees Centigrade followed by sintering by infrared not to exceed 400 degrees Centigrade. The sintered and dried sheet is void free and multi-directional planar oriented isotropic and form stable with a tensile strength of at least four thousand five hundred (4,500) psi and an elongation of at least three hundred fifty percent (350%) in any direction in the plane of the sheet.

Example 4

This example provides primary stand-alone colloidal (dispersion) PTFE resin particles, the basic resin form utilized in the present invention and a method of isolating these colloidal particles for use. These colloidal particles are commercially available as aqueous dispersions. The method of retrieving PTFE particles utilizes the miscibility of water with true PTFE wetting liquids such as methyl or ethyl alcohol. Water and alcohol are removed by filtering, and the colloidal PTFE particles are transferred to ISOPAR H, the wetting liquid selected for fibering. Traces of alcohol which may remain are miscible with ISOPAR H. ISOPAR H was selected as the wetting liquid for processing colloidal PTFE to produce micro-fibers because it has a boiling point of 176 degrees Centigrade and will remain in the liquid state as the PTFE resin is processed at 125 degrees Centigrade. To accomplish the above separation; three (3) volumes of DuPont "TEFLON" TD-37 (or equivalent aqueous dispersion of PTFE) are mixed with zero (0) to three (3) volumes of water and one (1) volume of alcohol, the slurry is filtered to remove the liquid components. The PTFE filter cake of colloidal particles is washed with alcohol, and then dried below 100 degrees Centigrade to remove all but a trace of alcohol. The dried PTFE colloidal filter cake particles can be employed as the starting resin mixed with wetting liquid as a coating composition; or as a paste extrusion composition in the hydrostatic coalescible state, containing 18 percent (18%) wetting liquid. The resin also may be combined with sufficient liquid, e.g., ISOPAR H, (1 part solids including PTFE resin to 20 parts ISOPAR H) for processing the PTFE component into isotropic micro-fibers in a slurry for coating or as an isotropic micro-fiber mat for further processing.

Example 5

This example employs the primary colloidal PTFE particles contained within the coagulated dispersion aggregate as a coating composition, feed for paste extrusion or as PTFE resin feed for processing into isotropic micro-fibers. In one embodiment, the colloidal particles are released from within the coagulated dispersion particle aggregate envelope (500 microns average particle size) by liquid shearing forces of ISOPAR H at ambient temperature. The PTFE coagulate is bathed in the wetting liquid which penetrates the aggregate packed with 0.2 micron average size discrete colloidal particles. The liquid shearing forces produced by a high speed disintegrator employing a tip rotor speed of about 2,000 feet per minute releases thousands of colloidal particles. These PTFE colloidal particles are separated from the liquid as a filter cake of primary particles for use in various applications. The dried particles may also be mixed with ISOPAR H or a wetting liquid with the desired viscosity for use as a coating composition or combined and mixed with the desired filler or additive materials for paste extrusion by adding 18 percent (18%) wetting liquid with the solids. The filtered PTFE resin or resin and filler/additive combinations with or without reinforcement fibers may be further processed to form PTFE resin micro-fibers as in Example 6.

Example 6

This example illustrates the processing of coagulated dispersion polytetrafluoroethylene resin to produce sheet by the present invention. In one embodiment, twenty (20) parts of ISOPAR H hydrocarbon oil are added to one (1) part of "TEFLON" 6 (DuPont) coagulated dispersion resin (having an average particle size of 500 microns) in a high intensity stirrer. The two (2) components are mixed for three (3) to five (5) minutes at a temperature of 125 degrees Centigrade producing a thick slurry of fibered particles. The particles produced are one quarter inch (¼") to three eights inch (⅜") long with average diameters ranging from five (5) to thirty (30) microns. The thick slurry is diluted further with thirty-five (35) parts of ambient temperature ISOPAR H and stirred an additional forty-five (45) seconds to produce a thinned homogeneous slurry. The thinned slurry is poured into a twelve inch by twelve inch (12" by 12") paper mold (containing a Whatman No. 1 filter paper). A vacuum of approximately twenty-five inches (25") of mercury was applied to settle the particles and remove the liquid component and form a "fiber mat". The "fiber mat" is then compressed containing approximately 18% wetting liquid at a pressure of approximately 500 psi at a temperature of 175 degrees Centigrade to provide a 0.030 inch thick fiber mat sheet with smooth surfaces. The isotropic "fiber mat" sheet is dried further at 125 degrees Centigrade in an oven to volatilize all remaining ISOPAR H, then free sintered for thirty (30) minutes in an oven at 380 degrees Centigrade. The above sheet had an average tensile strength of 4,500 psi and an average elongation of 350 percent (350%).

Example 7

A process is conducted that is the same as in Example 6 wherein only the primary colloidal particles are obtained directly from dispersion as prepared in Example 4.

Example 8

This example illustrates true reinforcement of PTFE fluorocarbon resin by the addition of one half inch (½") to three quarter inch (¾") diameter superfine glass fibers. One part of the solids component consists of twenty-five percent (25%) one half inch (½") to three quarter inch (¾") "Beta Fiberglass". The other portion is seventy-five percent (75%) "TEFLON" 6. Both parts are added to twenty (20) parts of ISOPAR H at 125 degrees Centigrade and sheared in a high intensity stirrer for three (3) minutes. The slurry produced is further diluted with thirty-five (35) parts of ISOPAR H and stirred for an additional one (1) minute to produce a thin homogeneous slurry. The thinned slurry is treated the same as in Example 6. After sintering, the sheet has an average tensile strength of 6,000 psi and an average elongation of five percent (5%) when measured in any direction. The tensile modulus is 250,000 psi. Ordinarily, fillers in art processes reduce the tensile properties by an amount proportional to the percentage of filler added. The tensile strength in this example is surprisingly equal to or greater than that of one hundred percent (100%) PTFE sheet (i.e., no fillers added).

Example 9

Primary colloidal particles derived by the method of Example 4 can be used alternatively to produce a product similar to that of Example 8.

Example 10

This example demonstrates the synergistic effect produced by adding micron size polymer particles that are compatible with PTFE resin to impart new improved properties to the finished product. The addition may be made to any of the following Examples 6, 7 8, and 9. In one embodiment, the polymer added is polyether ether ketone (PEEK). Thirty percent (30%) by volume is added based on solids content, to the PTFE resin solids of one of the above examples. The addition of PEEK improves physical properties, particularly where reinforcement fibers are added as in Example 8; here PEEK bonds to both PTFE and also to glass fibers. Other polymers that are compatible with PTFE, include, but are not limited to, polyether ketone (PEK), polyethersulfone (PES), polyphenylene sulfide (PPS). PEEK has exceptional adhesion to metals.

Example 11

Blends of melt processable fluoropolymers containing as little as 15 to 25 percent (15% to 25%) of matrix PTFE resin micro-fibers which provide an economic processing alternative to more expensive melt processable resin. Performs of these resin blends with a PTFE matrix would provide an alternate means of shaping and forming structures that have a biaxially oriented matrix and permit melt extrusion resins to include filler and inorganic fiber reinforcement. Candidates for blending include, but are not limited to, perfluoroalkoxy tetrafluoroethylene (PFA), tetrafluoroethylenehexafluoropropylene (FEP), poly (chlorotrifluoroethylene) (CTFE), ethylenechlorotrifluoroethylene (E-CTFE), ethylenetrifluoroethylene (E-TFE), polyphenylene sulfide (PPS), poly (vinylidine fluoride) (PVDF). Synergistic results may be expected.

Example 12

This example demonstrates the production of true standalone micro-fibers free of contamination. These micro-fibers have the proper dimensions and morphology and process continuously similar to cellulose fibers employed in papermaking. Micro-fibers processed at 125 degrees Centigrade exhibit excellent stand-alone characteristics; reinforcement fibers may be included if desired during processing. The PTFE micro-fibers produce excellent quality virgin biaxially planar oriented sheet on a continuous basis. The same process including reinforcement provides a source of truly reinforced sheet and a source of unsintered hydrostatic coaleseible preform that can be shaped, formed and embossed. Since all preformed product produced is isotropic the sintered structure remains dimensionally stable. All products made by this process are isotropic biaxial planar oriented.

Example 13

This example demonstrates the typical steps required to apply an art aqueous coating to a woven porous glass fiber matrix. This is accomplished by dipping the woven structure into the aqueous coating composition. Multiple passes are required to build the desired thickness free of cracks. Up to 6 percent (6%) surfactant is included in the coating composition. The typical maximum thickness that may be applied without cracking is 25.4 microns (1 mil) when dried. Each additional coating application must be dried to remove water (typically at 120 degrees Centigrade) then baked to remove the surfactant at 290 degrees Centigrade; and optionally calendered, then heated above the PTFE resin melting point, 327 degrees Centigrade, to sinter the coating. This procedure is repeated until the desired thickness is obtained.

Example 14

This example demonstrates the use of coating compositions that are produced according to Example 4. In one embodiment, a coating contains 60 percent (60%) solids comprising particulate dispersion PTFE resin prepared by Example 1 applied in a single dip coating step to a porous web surface then oven dried at a temperature below 300 degrees Centigrade and finally sintered above the PTFE resin crystalline melting point of 327 degrees Centigrade. No cracking or peeling has occurred and the coating is approximately 5 mils (0.005 inch) thick.

Example 15

This example demonstrates the use of a coating composition made from the slurried composition of micro-fibers produced in Example 6. This slurry is cast as a coating onto a glass mat of 2 to 5 micron diameter glass fibers ½ to ¾ inch long to act as a binder for the glass fiber-mat and remain porous. Such compositions are employed as separators in electrochemical cells. The resultant coating is dried and sintered. Porosity may be adjusted by the addition of Molecular Sieve Powder ($SiO_2$) sold by the W.R. Grace Division Syloid Products Group as Silosiv.

Example 16

Fillers, reinforcements and polymer additions may be added to improve the properties of coatings produced by Examples 4 and 5 by simply adding one or more of these components during processing of the PTFE resin.

Example 17

The addition of silicon carbide or the like to the process of Examples 6 and 7 will improve abrasion resistance and maintain inert properties of the composition.

Example 18

The addition of PEEK during the PTFE resin fibering process along with a reinforcement fiber provides improvement through attachment of the PEEK resin to both the PTFE micro-fibers and the fiber reinforcement component. Thus, adding strength and stiffening to the product dependent upon the type, strength and amount of the reinforcement additions.

Example 19

Fluoropolymers are well noted for their anti-stick qualities. This example describes the inclusion of polymers that will adhere to fluoropolymers and more particularly to PTFE resin surfaces as well as surfaces tolerant to temperatures in the range of 327 to 400 degrees Centigrade. Effective changes in properties may be accomplished by adding at least 15 volume percent of particulate micron size polymer to PTFE resin, in either micron size or fiber form, to a slurry mix. The total solids mix must not exceed 90 volume percent including PTFE resin solids. In order to be most effective sufficient melt processable resin is necessary to flow into and fill the PTFE resin preform voids estimated to be 16 to 20 percent (16% to 20%) of the preform structure.

Example 20

This example illustrates the processing of a mixture of micronized granular resin and coagulated dispersion polytetrafluoroethylene resin to produce sheet by this invention. In one embodiment, twenty (20) parts of ISOPAR H are added to one (1) part of a mixture consisting of thirty percent (30%)

"TEFLON" 7 or micronized PTFE and 70 percent (70%) "TEFLON" 6. The processing continues as described in Example 6. The finished sheet has an average tensile strength 4,600 psi and an average elongation of 360 percent (360%).

Example 21

This example describes the processing of a fibrous ceramic component with granular polytetrafluoroethylene resin to produce a sheet by this invention. In one embodiment, thirty (30) parts of ISOPAR H are added to one (1) part of solids composed of thirty percent (30%) "FIBERFRAX" (Carborundum Company, Cleveland, Ohio) and seventy percent (70%) "TEFLON" 6. "FIBERFRAX" is the trade name for a fibered ceramic composed of 53.9 percent by weight of silica and 43.4 percent by weight of alumina with a melting point of 1,790 degrees Centigrade it posses superior corrosion resistance, high resistance to oxidation and reduction and complete resistance to moisture. "FIBERFRAX" has a high aspect ratio of 200 to 1,000 often included in friction and filtration applications as well as for the reinforcement of plastics. The processing continues as in Example 8. The finished 0.030 inch thick sheet composition has an average tensile strength of 2,200 psi and an average percent elongation of 170 percent (170%) with superior resistance to creep and friction.

Example 22

This example demonstrates the utility of the composition produced in Example 21. At the conclusion of the fiber mat forming step, a portion of the "fiber mat" containing approximately 18% wetting liquid is die cut to produce a ring six inches (6") I.D. and eight inches (8") O.D. The die cut ring is placed in a vented heated mold which contains a bottom plate with a raised face embossing pattern. The pattern in this case is a grooved helix with intersecting radiating grooves every sixty (60) degrees. The raised pattern of the embossing tool is half rounded and has a radius of approximately fifteen (15) thousands of an inch. The mold with embossing pattern facing up is heated to approximately 260 degrees Centigrade, the die cut "fiber mat" is placed in the mold and a silicone rubber caul 0.025 inch thick is placed on top of the "fiber mat" followed by the top metal compressing ring. A pressure of approximately 2,000 psi is applied for one (1) minute; the silicone rubber caul is removed and the compression ring returned; the mold is closed for about fifteen (15) seconds, then 2,000 psi pressure is applied for an additional fifteen (15) seconds; the last step flattens any raised areas in the part. The embossed part is removed from the mold, the embossed grooves remain accurately replicated; the part is free sintered in an air-circulating oven for thirty (30) minutes at 380 degrees Centigrade; sintering has not altered the surface dimensions of the part and the grooves imparted by the embossing tool are accurately replicated in the part. The grooved disc 0.030 inch thick is one (1) of six (6) like parts to become friction facings on metal components that comprise a clutch pack utilized in heavy equipment such as earth movers manufactured by Caterpillar Tractor Company and the like. Such clutch pack surfaces are wetted with high temperature heat transfer liquids that are circulated throughout the pack to remove heat generated by the friction during engagement. The grooves in the facing circulate liquid to reduce the heat generated by friction generated on engagement. The clutch facings by this invention were bonded to one (1) surface of each disc. In order to bond the facing of the metal disc, the backside of the facing produced was chemically etched employing a sodium complex etchant (available commercially) and then bonded to the metal clutch disc with an epoxy-phenolic adhesive sold by Raybestos-Manhattan. A heavy equipment manufacturer tested a pack of six (6) discs in a torture test to find surprisingly positive performance and endurance. Laboratory tests were also performed on an inertia-stop testing apparatus. The presentation showed smooth engagement and disengagement which is highly desirable in heavy equipment. The clutch-facing bond has high resistance to torque and the facing long resistance to wear.

Example 23

This example demonstrates the inability of the art to manufacture a product similar to Example 8. The art processes have been unable to mold thin filled composition particularly fibered materials. Molded parts are extremely fragile because resins and fillers and particularly fibers will not cohesively bond even when attempts to preform are made at extremely high pressure. Thin sheet would by necessity be made by skiving (shaving) a billet (cylinder) in a lathe. Skiving would be prohibitive because Fibeifiax would dull the skiving blade. The pattern embossed in the molded clutch facing material is embossed by coining. Coining is accomplished by heating the filled sintered sheet above the 327 degree Centigrade melt temperature of the PTFE resin and compressing the embossing pattern into the sheet to replicate the pattern. The finished coined sheet does not have dimensional stability and the embossed pattern is not accurately replicated due to shrinkage and warping when heat is applied.

Example 24

This example demonstrates the invention's use in manufacturing asymmetric porous integral membranes for use in filtration in the electronics and pharmaceutical industries. Twenty (20) parts ISOPAR H are added to one (1) part of solids of which twenty percent (20%) is "TEFLON" 6 and eighty percent (80%) is calcium carbonate, the fugitive pore former has an average particle size of ten (10) microns preferably less. The two components are mixed for three (3) to five (5) minutes in a high shear disintegrator operating at a peripheral speed of 2,000 feet per minute at a temperature of 125 degrees Centigrade to produce a heavy slurry. The heavy slurry is diluted further with thirty-five (35) parts of ambient temperature ISOPAR H and stirred for an additional forty-five (45) seconds to produce a thinned homogeneous slurry. The thinned slurry is poured into a twelve inch by twelve inch (12" by 12") paper mold containing a Whatman No. 1 filter paper. A vacuum of approximately twenty-five inches (25") of mercury is applied to settle the solids and remove the liquid component and form a "fiber mat". The isotropic "fiber mat" containing approximately 18% wetting liquid is set aside protected from wetting liquid loss by evaporation. A second sheet is prepared using the same procedure as above; only the particle size of the calcium carbonate is five (5) microns average particle size; the sheet is set aside as above. A third sheet is prepared using the same procedure only the calcium carbonate is two (2) to three (3) microns average particle size. The three wetted sheets are layered over the other by ascending average particle size. The plied sheets are then heated to 175 degrees Centigrade and compressed at 500 psi or more depending on sheet thickness to bond the plies. The plied composite is then free sintered at 380 degrees Centigrade for thirty (30) minutes and air cooled to room temperature. The composite sheet is then treated with dilute hydrochloric acid to leach the calcium carbonate from the composite. Once free of the calcium carbonate, the sheet is washed with water to remove all traces of acid. The average pore size of each layer replicates the particle size of the calcium carbonate employed as the pore former in each polytetrafluoroethylene filtering membrane layer. The size of the pores produced is directly proportionate to the size of the pore former and can range from sub-micron sizes to macro-size particles dependent entirely upon the ability to process suitable leachable particulate materials.

Example 25

This example demonstrates the addition of a filler component to provide electrical resistivity and more particularly, a structure made according to this invention which is not sintered. Surprisingly, the composition exhibits isotropic resistance heating characteristics. The heating characteristics were found to be essentially constant over the entire multi-directional planar oriented structure surface even when there was a variation in the current flow. Customarily, the resistance of carbon decreases as temperature is increased. Surprisingly, the resistance of the structure made by this invention remains substantially constant as the temperature is increased. 2,000 ml of ISOPAR H are added to the chamber of a high intensity stirrer and heated to 125 degrees Centigrade. In this example, 150 grams of "TEFLON" 6 coagulated dispersion resin (DuPont) was added to the stirring vessel and exposed to the high streamlined shear of the stirrer for three (3) minutes to produce a micro-fiber structured "TEFLON" 6. An additional 2,000 ml of ISOPAR H was added, followed by 80 grams of 0.03 micron carbon black (Vulcan 72). The above mixture was stirred for one (1) minute, followed by the addition of 270 grams of silica (Opal Supersil), average particle size, 7 microns. The mixture was stirred for an additional thirty (30) seconds to produce a homogeneous slurry. The slurry was then poured onto a paper mold containing a Whatman No. 1 filter paper. A vacuum of approximately twenty-five inches (25") of mercury was applied to remove the liquid and settle the mixture and form a "fiber mat" of solids. Complete removal of residual liquid was accomplished by heating in a circulating air oven at a temperature of 200 degrees Centigrade or higher (but should never approach the 327 degree Centigrade melting point of the fluoropolymer). The composite sheet was then trimmed to the desired dimensions and positioned on wallboard. A copper electrode was placed at either end and a sheet of polypropylene is placed over the top of the lay-up. The lay-up was heated to 100 degrees Centigrade and pressed at 350 psi for ten (10) minutes to produce a bond. The finished composition is unsintered. The resistance of the sandwich as calculated by Ohm's law is essentially constant. The resistance of carbon when alone increases under similar conditions. The resistance of the sandwich surprisingly remained essentially constant as the temperature was increased.

Example 26

This example demonstrates the use of anisotropic fibers taught in the art to prepare sheet as practiced by Harford U.S. Pat. No. 3,003,912 (2: 21-34 and 3: 71-74). A process wherein an ¼ inch diameter beading is paste extruded, dried and then cut into short lengths ¼ to 1 inch long and micropulverized to produce fine fibers (3: 25-33) which were slurried in water with a disbursing agent. The slurry was deposited on a porous surface as in paper making to remove water then dried and sintered the sheet produced shrank forty percent 40% in area and is porous. Shrinking and porosity is due to the anisotropic nature of the fibers produced. The use of water that repels PTFE resin surfaces is detrimental to coalescence of particles and the strength of the product. As described herein, the wetting liquid processing temperature of 125 degrees Centigrade will convert the anisotropic fibers of Harford to the isotropic form as taught by the present invention. The 125 degrees Centigrade processing temperature of the present invention is well above the ambient temperature of the paste extrusion process and sufficient to remove the anisotropic uniaxial orientation properties instilled by Harford almost instantaneously. Note: Harford's approach is significantly longer, is indirect and requires 125 degrees Centigrade mixing in a wetting liquid in order to provide isotropic fibrils that must follow the steps of this invention to be successful.

Example 27

Complex compression molded products easily preformed at low pressure on portions of hydrostatic pressure coalescible isotropic fiber-mat sheet or laminate containing 16 to 20 percent wetting liquid are prepared according to Examples 1 or 2 and 3; or compositions of this invention described herein formed, shaped and embossed at 100 to 2000 psi while heated up to 300 degrees Centigrade, dried below 300 degrees Centigrade and sintered between 327 and 400 degrees Centigrade, preferably at 380 degrees Centigrade according to the method of Example 12.

Example 28

Isotropic biaxial planar oriented fiber mat of Example 3 either containing 18% wetting liquid or dry, wetting liquid added prior to use, marketable to fabricators to replace anisotropic compression molding resin. Dry fiber mat can be re-slurried at ambient temperature, compounded and processed in small batches as described in Example 1. Fabricators depending on their ability can do their own compounding and/or fabrication of isotropic staple length fibers.

Example 29

This example describes the use of Grace Davidson Chemical Company "SYLOSIV" molecular sieves for preparing novel porous PTFE resin products wherein the "SYLOSIV" $SiO_2$ particles inherently contain Angstrom size pores that result in $SiO_2$ particles with densities of about 0.2 to 0.3 grams/cc. The "SYLOSIV" particles are treated as a filler and processed according to Example 4 solids containing one (1) volume of DuPont "TEFLON" 6 and six (6) volumes of "SYLOSIV". During sintering the pores in the molecular sieves may contain wetting liquid or gas which escapes at drying and sintering temperatures and acts as a blowing agent to develop a porous structure within the PTFE resin isotropic biaxially planar oriented structure; the $SiO_2$ remains with the PTFE resin as a filler. The sintered filled PTFE resin product with filler has a density of 1.4 grams/cc, the product is tough, flexible, and rubbery with a uniform thickness. Other functional fillers may be added as required.

Example 30

This example is similar to Example 25 only the three layer finished product is sintered between layers of unfilled PTFE sheet made according to Example 1 without changing the isotropic resistance characteristics of the mix of PTFE resin, carbon black and silica; the wallboard and polypropylene sheets are both replaced by a PTFE sheet; each layer contains about 18% ISOPAR H; the three wetted layers are laminated at up to 300° C. and compressed at or above 250 psi (depending on laminate thickness); the laminate will be isotropic biaxial planar oriented and will have constant resistance over the entire face of the laminate.

Example 31

This example demonstrates the application of porous colloidal silica particles (which contain Angstrom size pores) employed to produce pores in the multi-directional planar oriented isotropic polytetrafluoroethylene (PTFE) resin matrix structures of this invention and to remain in the structure desired to provide sites for the deposition of atomic size catalyst conductive elements, such as platinum, copper, lithium and other rare earth metals useful in fuel and solar cells and other closely related green technologies of this invention. Such molecular sieve products are produced by W.R. Grace, UOP a Honeywell Company, Monsanto and others; 6 volumes of Santocel 54 (Monsanto) density about 0.2 to 0.3 g/cc, 1 volume of "TEFLON" 6 or equivalent added to 20 volumes of ISOPAR H at 125° C. processed as in Example 1. The product is tough, flexible and somewhat rubbery; with a density of 1.4 g/cc.

Example 32

Some anisotropic PTFE fibers and micron size particles strained in process originally destroy isotropy can be reversed by the subject invention if strain was introduced at ambient or a temperature significantly below 125° C. (252° F.). The following anisotropic PTFE resin forms are examples that may be compounded as additives in this invention:
1. "Micronized" PTFE resin particles of an average size of about 25 microns (generally available from all suppliers) is processed at ambient temperature or below and are known to be anisotropic.
2. DuPont "TEFLON" 7 (described in Thomas U.S. Pat. No. 2,936,301), discrete fibers in the micron size range.
3. Harford (U.S. Pat. No. 3,003,912) describes one-eighth (⅛) inch diameter anisotropic paste extruded beading extruded at ambient temperature and cut to staple length. This can be included as an additive; it quickly becomes isotropic and compatible when exposed to the 125° C. temperature of the subject invention.

Example 33

Examples of some embodiments of the present invention are provided below.
1. A multi-directional planar oriented isotropic polytetrafluoroethylene (PTFE) resin structure prepared from stand-alone staple length isotropic micro-fibers produced from nano crystallites obtained from the contents of spheroidal as polymerized dispersion particles known to be nearly 100% crystalline; wherein said isotropic staple length micro-fibers are prepared and rapidly followed by a method wherein a wetting liquid slurry at about 125° C. as liquid shear penetrates and releases crystallites that reform in the liquid shear stream as staple length micro-fibers that bulk quickly and further diluting the liquid slurry to provide a homogeneous mix, wherein the homogeneous mix is deposited to form a uniform fiber-mat of interlocking multi-directional staple length micro-fibers wherein the PTFE fiber-mat is compressed at low pressure and dried simultaneously below about 300° C., then sintered between about 327° C. and 400° C.; wherein the structure of the PTFE fiber-mat before and after sintering has essentially equal strength in any direction in the plane of the PTFE fiber-mat surface, and wherein the length and width, the x y dimensions, of the PTFE fiber-mat remain stable with temperature change; and wherein changes in volume of the PTFE fiber-mat due to temperature occur in thickness, the z dimension, and wherein the dried and sintered PTFE fiber-mat retains the above properties as a sheet, membrane, or other structures.

2. A multi-directional planar oriented isotropic coating product, obtained from the method of embodiment 1 before deposition as a fiber mat, wherein the wetting liquid dilution level is adjusted for the coating application technique to be employed wherein the coating application technique is dipping, casting, spraying, roller coating, coat hanger casting or impregnation and wherein the coating does not have a "critical cracking thickness" and does not contain dispersing agents; and wherein coatings thicker than 5 mils can be applied in a single application; and wherein the coating can contain additives.

3. A coating product having a multi-directional planar oriented isotropic PTFE structure of embodiment 1 deposited as a PTFE fiber-mat, wherein the wetting liquid dilution level and viscosity are adjusted for the PTFE coating application technique to be employed wherein the coating application technique is dipping, casting, spraying, roller coating, coat hanger casting or impregnation; wherein the PTFE coating does not have a "critical cracking thickness" and does not contain dispersing agents; and wherein the PTFE coating can be applied thicker than 5 mils in a single application; and wherein the PTFE coating can contain additives.

4. A multi-directional planar oriented isotropic PTFE sheet or membrane structure produced according to the method of embodiment 1, wherein the sheet or membrane structure is prepared in sintered or unsintered form with or without 18% wetting liquid and optionally comprising material additions up to 90% by volume of one or more of the following materials:
    a) additives containing an inorganic filler of micron size;
    b) additives containing reinforcements;
      (i) inorganic reinforcement such as glass fibers, carbon fibers, ceramic fibers and polymeric fibers such as polyimides;
      (ii) anisotropic polytetrafluoroethylene micro-pulverized fibrils unsintered;
      (iii) anisotropic fibrous polytetrafluoroethylene (DuPont "TEFLON" 7);
      (iv) anisotropic micronized PTFE resin, particle size approximately 25 microns;
    c) additives containing micron size as polymerized unmelted melt processable polymeric particles capable of withstanding the processing temperature of polytetrafluoroethylene resin;
      (i) fluoropolymer resins: such as tetrafluoroethylene-hexafluoropropylene copolymer resin (FEP), poly (chlorotrifluoroethylene) resin (CTFE), perfluoroalkoxy tetrafluoroethylene copolymer resin (PFA), ethylenechlorotrifluoroethylene copolymer resin (E-CTFE), ethylenetrifluoroethylene copolymer resin (E-TFE) and poly (vinylidine fluoride) resin (PVDF);
      (ii) non-fluoropolymer resins: polyether ether ketone (PEEK), polyether ketone (PEK), polyethersulfone (PES) and polyphenylene sulfide (PPS); and
    d) additives containing combinations of additives of any of a), b), and/or c).

5. The multi-directional planar oriented isotropic PTFE sheet or membrane structure according to embodiment 4, wherein the inorganic filler of micron size is below about 25 microns in size.

6. A multi-directional planar oriented isotropic PTFE sheet or membrane structure retaining approximately 18% wetting liquid prepared according to the method of embodiment 1, wherein the sheet or membrane is multi-layered in functional sequence without the use of adhesives to produce a composite functional laminate structure; wherein the product is produced in any width continuously by layering, wet compressing, drying below 300° C., and sintering between 327 and 400° C. depending on product thickness.

7. The multi-directional planar oriented isotropic PTFE sheet or membrane according to embodiment 6, wherein the sheet or membrane is used in a fuel or solar cell or in an electrode or resistance heater.

8. The multi-directional planar oriented isotropic PTFE sheet or membrane according to embodiment 4 wherein the additive is an extractable poreformer of known size such as calcium carbonate; and wherein the composition is further processed after sintering, and wherein the extractable poreformer is extracted from the sheet or membrane to provide a porous sheet or membrane whose pore size is replicated by the poreformer.

9. The multi-directional planar oriented isotropic PTFE sheet or membrane according to embodiment 8, wherein the extractable poreformer is calcium carbonate and can be extracted with hydrochloric acid.

10. A multi-directional planar oriented isotropic PTFE resin asymmetric filter membrane comprising layers of multi-directional planar oriented isotropic PTFE sheet or membrane prepared according to the method of embodiment 1, wherein the asymmetric filter is capable of removing particles down to atomic size for use in purification of liquids used in the electronics and pharmaceutical industry.

11. A laminated polytetrafluoroethylene (PTFE) resin multi-directional planar oriented isotropic form stable fuel cell matrix prepared using a multi-directional planar oriented isotropic PTFE structure prepared according to the method of embodiment 1, comprising functional components and laminate assembly bonded thermally without the use of adhesives suitable to provide high conversion efficiency, with long life, continuously processed in long lengths comprised of:
   a) an anode and cathode with embossed surface channels to provide a path for electrons freed from hydrogen molecules to enable their use as an external circuit and to disperse the hydrogen molecules equally over the catalyst surface; or
   b) water repellent catalyst membrane layers containing PTFE and a high conductivity micron size composition, such as platinum, or a mix of platinum and carbon, in porous or non-porous PTFE form or a laminate of both; or
   c) porous conductive membranes wherein one is placed on either side of the catalyst membrane of b); or
   d) a), b), and/or c) optionally plus other possible layers provide one functional unit of a multiple stack.

12. A laminated polytetrafluoroethylene (PTFE) resin based multi-directional planar oriented isotropic form stable matrix for photovoltaic solar cell components and suitable for generating solar energy prepared using a multi-directional planar oriented isotropic PTFE structure prepared according to the method of embodiment 1; wherein the matrix comprises copolymers and wherein the polytetrafluoroethylene and its copolymer matrix used for some layers has no absorption hands of consequence from the visible region up to a strong opacity at about 8 to 8.7 µm; wherein PTFE's transparency therefore provides an ideal matrix to hold multi-layered functional layered filled structures such as:
   a) solar radiation absorbers in the base layer such as forms of silicon, or other conductors;
      (i) the ability to emboss patterns in the base layer to concentrate solar radiation; or
   b) a matrix for adding layers of diffusers and or reflectors; or
   c) a top layer containing ethylenechlorotrifluoroethylene (E-CTFE) to improve the long time friction and wear characteristics of the structure, with proven life longer than 20 years.

13. A product produced using a multi-directional planar oriented isotropic PTFE structure prepared according to the method of embodiment 1, wherein the structure contains about 18% wetting liquid, wherein the product is used as product for conventional art compression molding to produce products with greatly improved properties and much broader utility.

14. A sheet section of a product produced using a multi-directional planar oriented isotropic PTFE structure prepared according to the method of embodiment 1, containing about 18% wetting liquid formed, shaped, and embossed to provide complex surface patterns in products.

15. PTFE nano crystallite products of embodiment 1 alloyed with unmelted fluff or powder of melt processable resins to increase resin melt viscosity and make molding by this invention practical.

16. A laminate of two or more multi-directional planar oriented isotropic PTFE structures of embodiment 1 prepared as sheets, compressed while containing about 18% wetting liquid, compressed and dried simultaneously below 300° C., then sintered below 400° C., and thermally bonded without the use of adhesives.

17. A porous multi-directional planar oriented isotropic PTFE sheet or membrane prepared according to the method of embodiment 1, and containing a filler addition that is not fugitive that remains in the structure; wherein filler particles contain porous molecular sieves that contain angstrom size pores; wherein the volatile pore content acts as a blowing agent when the structure is sintered but remain in the structure to selectively remove certain gases and liquids and to act as a support for catalysts and conductive materials such as: platinum and other rare metals.

18. The multi-directional planar oriented isotropic polytetrafluoroethylene (PTFE) sheet or membrane according to embodiment 4, in sintered or unsintered form and containing a weight percent mixture of (16%) 0.03 average micron carbon black (Vilcan 72), (55%) silica (Opal Supersil) 7 microns and (29%) PTFE "TEFLON" 6 coagulated dispersion resin processed at 125° C.; wherein the composition containing 16% carbon black and 55% silica is laminated between porous layers of PTFE sheet, dried but unsintered or between sintered sheet; wherein the composition layer has unusually uniform volume resistivity (ohms-cm) over the face of the sheet; and copper electrodes implanted in the conductive layer characterize the uniform resistive properties and uniform heating qualities over the entire surface.

19. The multi-directional planar oriented isotropic polytetrafluoroethylene (PTFE) resin structure according to embodiment 3c wherein PTFE resin act as a diluent for perfluorosulfonic acid (PFSA)/PTFE copolymer to thermally stabilize the membranes x y dimensions in service and improve strength.

20. A multi-directional planar isotropic polytetrafluoroethylene (PTFE) resin structure according to embodiments 3c, 8, and 19 wherein only the PTFE and PFSA resin contains a pore former as in embodiment 8 to create membrane pores of predictable size with varying pore surface area.

21. The multi-directional planar oriented isotropic polytetrafluoroethylene (PTFE) resin structure according to embodiment 11, containing a pore forming filler which contains molecular sieves with pores that can perform selective filtering functions to remove or retain liquids or gases or contain catalysts or highly conductive fillers within and on their nanoporous surfaces to provide greatly expanded surface area contacts; wherein the molecular sieve pores contain liquids or gases that volatilize and expand during the drying and sintering steps as described in embodiment 1 to blow microscopic pores in the PTFE matrix and provide a porous product which is tough, rubbery and has a very low density, high surface area and the dimensional stability of the PTFE matrix.

22. A roll of unsintered "fiber mat" product prepared using a multi-directional planar oriented isotropic PTFE structure prepared according to the method of embodiment 1, wherein the product is dried or containing 18% wetting liquid and available in suitable thicknesses for further processing as sheet, laminate, compression molding feed, or for backward integration into coating compositions; wherein the wetting liquid is mixed in at ambient temperature.

23. A roll of unsintered "fiber mat" product prepared using a multi-directional planar oriented isotropic PTFE structure prepared according to the method of embodiment 1, wherein the product is dried or containing 18% wetting liquid available in suitable thicknesses for further processing as sheet, laminate, compression molding or uniaxial and biaxial paste extrusion feed and for coating compositions; wherein wetting liquid is added at ambient temperature to dried fiber-mat or using wet fiber-mat directly.

24. Continuous lengths of multi-directional planar oriented isotropic PTFE sheet or membrane of embodiment 1, wherein the sheet or membrane are comprised of nano crystallites of PTFE wherein the products may be filled, reinforced, porous, alloyed or be included together, or as crystallites of PTFE alone.

25. The products of embodiment 24 in laminated form, containing any combination of the additives of embodiment 4 or 8.

26. The multi-directional planar oriented isotropic polytetrafluoroethylene (PTFE) resin structure according to embodiment 1, 6, or 16, wherein the PTFE fiber-mat is sintered at around 380° C.

27. The coating product of embodiment 2 or 3, wherein the additives are fillers, reinforcements, alloying polymers and pore formers.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

Plunkett U.S. Pat. No. 2,230,654
Thomas U.S. Pat. No. 2,936,301
Ree U.S. Pat. No. 4,153,661
Harford U.S. Pat. No. 3,003,912
Solomon U.S. Pat. No. 4,339,325
Roberts U.S. Pat. No. 3,556,161
Debe U.S. Pat. No. 5,910,378
Friedrich U.S. Pat. No. 6,352,660
Encyclopedia of Polymer Science and Technology (1970) by John Wiley & Sons, Inc., Volume 13, pages 64, 630, 641.
Kirk-Othmer (1966). Encyclopedia of Chemical Technology, Volume 9, 2nd edition, Interscience Publishers, a division of John Wiley & Sons, Inc., New York, page 7.
Daniels, Farrington (1948). Physical Chemistry by Farrington Daniels, professor of Chemistry, University of Wisconsin, Fourth Edition, John Wiley & Sons, Inc. New York, pages 42, 185.
Dalla Valle, J. M. and Pitman, D. S. (1943). Micromeritics, The Technology of Fine Particles, Publishing Corporation, New York and Chicago Copyright, pages 100-129.
Hartman, Robert J. (1947). Colloid Chemistry, Second Edition, The Rainbow Press, Cambridge, Mass.

I claim:

1. A multi-directional planar oriented isotropic polytetrafluoroethylene (PTFE) resin sheet or membrane structure comprising a weight percent mixture of (16%) 0.03 average micron carbon black, (55%) silica having an average particle size of 7 microns, and (29%) PTFE interlocking multi-directional micro-fibers.

2. The multi-directional planar oriented isotropic PTFE sheet or membrane structure according to claim 1, wherein the sheet or membrane is multi-layered in functional sequence without the use of adhesives to produce a composite functional laminate structure.

3. The multi-directional planar oriented isotropic polytetrafluoroethylene (PTFE) sheet or membrane structure according to claim 2, sintered at about 380° C.

4. A fuel or solar cell or an electrode or resistance heater comprising a multi-directional planar oriented isotropic PTFE resin sheet or membrane structure of claim 1.

5. The multi-directional planar oriented isotropic PTFE sheet or membrane according to claim 1, further comprising an extractable poreformer of known size, and wherein the extractable poreformer can be extracted from the sheet or membrane to provide a porous sheet or membrane.

6. The multi-directional planar oriented isotropic PTFE sheet or membrane according to claim 5, wherein the extractable poreformer is calcium carbonate.

7. An asymmetric filter membrane comprising layers of multi-directional planar oriented isotropic PTFE sheet or membrane of claim 1, wherein the asymmetric filter is capable of removing particles down to atomic size for use in purification of liquids.

8. A laminate comprising two or more multi-directional planar oriented isotropic PTFE sheet or membrane structures of claim 1 thermally bonded without the use of adhesives.

9. The laminate according to claim 8, sintered at about 380° C.

10. The multi-directional planar oriented isotropic PTFE sheet or membrane according to claim 1, wherein the sheet or membrane is porous.

11. A roll of fiber-mat product comprising a multi-directional planar oriented isotropic PTFE sheet or membrane structure of claim 1.

12. The multi-directional planar oriented isotropic polytetrafluoroethylene (PTFE) sheet or membrane structure according to claim 1, sintered at about 380° C.

* * * * *

UNITED STATES PATENT AND TRADEMARK OFFICE
CERTIFICATE OF CORRECTION

PATENT NO.         : 8,895,139 B2
APPLICATION NO.    : 12/826360
DATED              : November 25, 2014
INVENTOR(S)        : Robert Roberts Page 1 of 1

It is certified that error appears in the above-identified patent and that said Letters Patent is hereby corrected as shown below:

In the Specification

Column 4,
Lines 49-50, "polyethcretherketone" should read --polyetheretherketone--.

Column 7,
Line 25, "Coal escible" should read --Coalescible--.

Column 8,
Lines 16-17, "three eights inch (%) long" should read --three eights inch ($^3/_8$) long--.

Column 9,
Line 67, "polytetrafluorocthylene" should read --polytetrafluoroethylene--.

Column 11,
Line 18, "Performs" should read --Preforms--.
Line 42, "coaleseible" should read --coalescible--.

Column 14,
Line 22, "Fibeifi ax" should read --Fiberfrax--.

Column 17,
Line 57, "rapidly followed" should read --rapidly formed--.

Signed and Sealed this
Twenty-fourth Day of November, 2015

Michelle K. Lee
*Director of the United States Patent and Trademark Office*